June 1, 1937. C. F. GODDARD Re. 20,385
GREASE GUN
Original Filed March 26, 1923
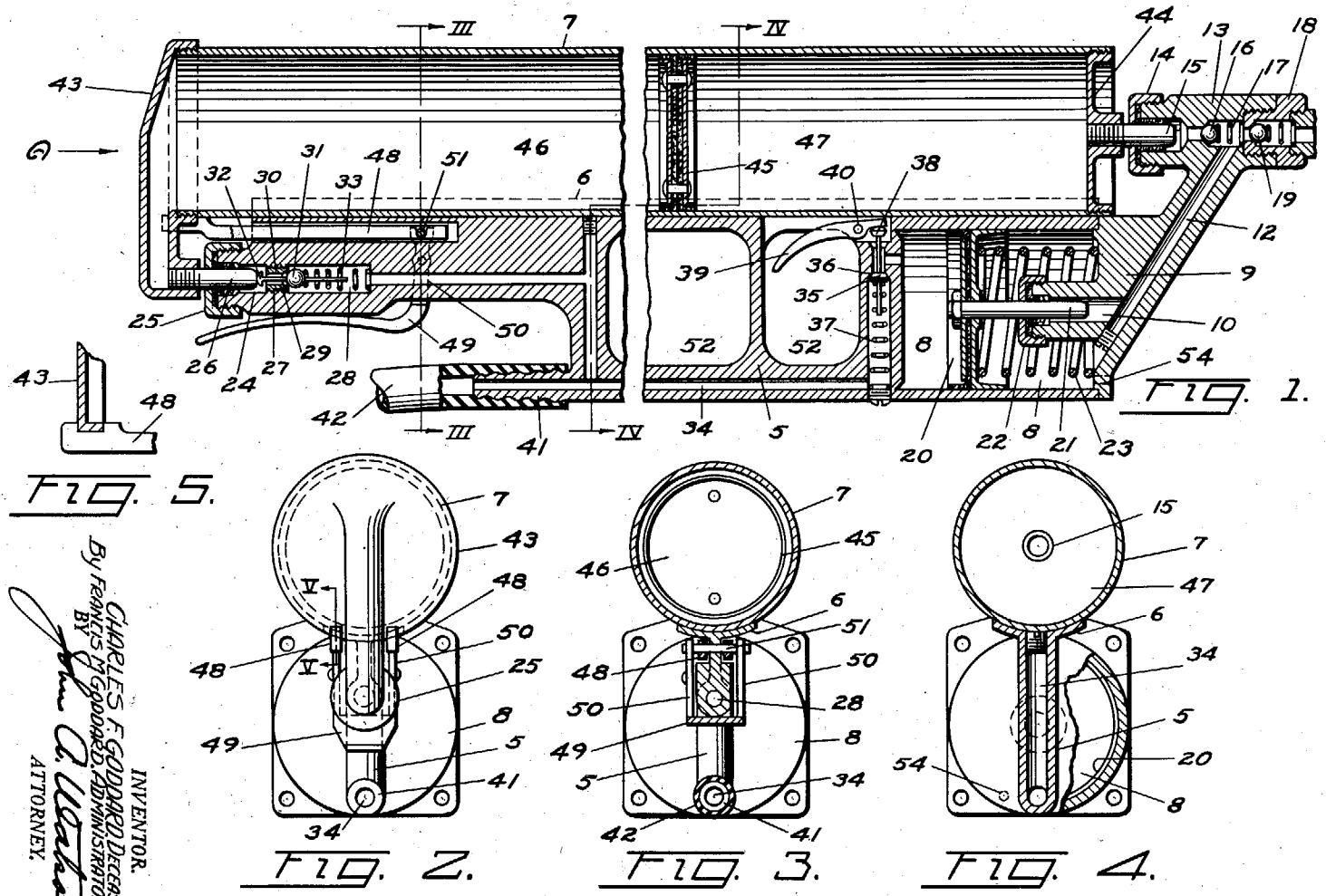
INVENTOR.
CHARLES F. GODDARD, DECEASED
By FRANCIS M. GODDARD, ADMINISTRATOR.
BY John A. Watson
ATTORNEY.

Reissued June 1, 1937

Re. 20,385

UNITED STATES PATENT OFFICE 20,385

GREASE GUN

Charles F. Goddard, deceased, late of Denver, Colo., by Francis M. Goddard, administrator, Denver, Colo., assignor, by mesne assignments, to The Lubrication Corporation, Chicago, Ill., a corporation of Delaware Original No. 1,787,783, dated January 6, 1931, Serial No. 264,940, March 26, 1928. Application for reissue November 29, 1932, Serial No. 644,924

40 Claims. (Cl. 221—47.3)

This invention relates to lubricating devices of the type commonly known as grease guns, more particularly to a portable hand gun, and its primary object is to provide apparatus of this character in which a lubricant reservoir is demountably associated with a mechanism forcibly to feed lubricant from the reservoir to a machine part.

By the use of the invention, containers previously filled with a lubricant, may be held in reserve, so that when one container is exhausted, another may be immediately applied in the place thereof.

Another object of the invention is to provide, in a grease gun, a very simple means for ejecting the lubricant from the reservoir by means of compressed air or other pressure fluid.

A further object is to provide a gun which ejects the lubricant in measured quantities according to the requirements of the machine part to be lubricated, and still other objects reside in details of construction and novel and useful arrangements and combinations of parts as will fully appear in the course of the following description.

In the accompanying drawing in which like characters of reference designate corresponding parts throughout the views, Figure 1 represents a sectional elevation of a grease gun constructed in accordance with the invention, a portion thereof having been broken away for lack of space, Figure 2, an end view of the gun, looking in the direction of the arrow A in Figure 1, Figure 3, a section taken on the line 3—3, Figure 1, Figure 4, a section taken along the line 4—4, Figure 1, and Figure 5, an enlarged fragmentary section on the line 5—5, Figure 2.

Referring further to the drawing, the gun comprises a stock 5 provided with a curved seat 6 for the support of the reservoir 7.

The stock carries the operative parts of the gun proper together with means for connecting said parts with the reservoir, and it is further associated with a source of fluid under pressure, and with hand controlled devices for connecting the source with the grease ejecting element of the gun.

The stock is enlarged at its forward end to provide a cylindrical piston chamber 8 which is closed by means of a head 9 that has an air vent 54. The head has a plunger chamber 10 of smaller diameter in coaxial relation with the piston chamber while a duct 12, connecting with the interior of a coupling member 13, is adapted to connect the plunger chamber with either the reservoir or a machine part to which the gun is applied.

The coupling at one end of its interior passage has a packing gland 14 adapted to admit a nipple 15 on the reservoir, as will hereinafter be described, and the flow of lubricant through said passage between the nipple and the duct, is controlled by a check valve 16. The valve is preferably a ball form and is normally held in engagement with its seat 17 by a coiled spring that abuts against a hollow screw gland 18 at the outer end of the coupling.

A second check valve 19 may be employed to control the passage of lubricant from the duct 12 to a machine part to which the coupling is applied, but this second valve is not positively essential in the operation of the gun and may be omitted.

Fitted for reciprocation in the piston chamber, is a piston 20, with which is associated a plunger 21 fitted for reciprocation in the plunger chamber. A stuffing box 22 at the end of the small cylinder 10, prevents leakage of lubricant around the plunger into the larger cylinder 8.

A coiled spring 23 returns the connected pistons to their normal position after each ejective movement. It will be apparent that the pressure pump thus produced operates on the principle of a hydro-static press to the extent that it involves an element having differentiated areas, one of which is subject to fluid pressure for the exertion of a correspondingly multiplied pressure by the other.

At the other end of the stock 5 is a socket 24 which, at its outer end, is provided with a packing gland 25, to admit another nipple 26 on the reservoir 7. The socket is partitioned by a threaded plug 27 which defines a valve chamber 28, and which provides a valve seat 29 in connection with a central passage 30.

A valve 31, preferably of spherical form, is mounted on a stem 32 which moves through the passage of the screw-plug. The end of the stem, at the opposite end of the plug, has a head to be engaged by the end of the nipple 26, and a coiled spring 33 in the valve chamber, holds the valve to its seat when the nipple is withdrawn from the socket.

The valve-chamber 28 is connected with the larger cylinder of the pump by a duct 34, comprising a number of intercommunicating passages in the body of the stock. The passage of air or other pressure fluid through this duct from the valve chamber of the socket 24 to the piston chamber 8, is normally obstructed by a valve 35, which is held in place against a valve seat 36 by a coiled spring 37. The valve 35 has a stem provided with an exhaust valve 38. The exhaust valve is engaged by a trigger 39 pivoted on the stock, as at 40.

Movement of the trigger 39 moves the valve 38 to its seat and moves the valve 35 from its seat, admitting fluid pressure in the duct 34 to the larger piston. When the trigger is released, the spring 37 seats the valve 35 and opens the valve 38, allowing the fluid pressure in the cylinder 8 to exhaust into the atmosphere. The duct 34, at a point between the socket and the valve seat, has a nipple 41 for its connection with a source of pressure fluid, the connection being usually established by medium of a flexible conduit 42.

The reservoir 7 consists of a cylindrical container normally supported upon the seat 6 of the stock. The container is closed at its ends by heads 43 and 44, and these heads carry the before mentioned nipples 26 and 15, which consist of short screw-threaded tubes tapered at their ends to facilitate their insertion through the packing glands 25 and 14, at the ends of the stock. A free floating piston 45, in the container, divides the latter into an air chamber 46 and a lubricant chamber 47.

When the container is in its operative position with relation to the pump element, its nipples extend through the packing glands to connect the air chamber 46 and the lubricant chamber 47, respectively, with the socket 24 and with the coupling 13. The container in this position is fastened in place by two latch bars 48, which embrace the head at the lower edge thereof, as shown in Figure 2, and which are held in contact with the head by a toggle lever 49, an arm 50 of which engages with studs 51, at the ends of the bars. The bars are slidably held in correspondingly formed slide ways at the rear end of the stock.

In the operation of the grease gun, a reservoir whose lubricant chamber 47 has previously been supplied with a lubricant, is fastened upon the seat 6 of the stock by means of the latch bars 48. In this position, the nipple on the head 43 of the reservoir, extends through the packing gland 25 into the socket 24 and the nipple 15, at the opposite end of the reservoir, extends through the packing gland 14 into the hollow coupling member 13 of the head 9 of the piston cylinder 8 on the stock 5.

The nipple 26, by engagement with the stem 32, has separated the valve 31 from its seat, thereby establishing a constantly open connection between the source of pressure fluid and the air chamber 46 of the barrel. The valve 35 normally engages its seat to obstruct the passage of air from the source to the piston chamber 8, through the duct 34, and the large piston 20 and the therewith connected smaller piston 21, are held at the ends of their respective chambers by the spring 23.

The valve 16, in the coupling, normally held to its seat by the spring 17, obstructs the connection between the duct 12 and the lubricant chamber 47 of the container, it being understood that the duct 12 and the small piston chamber 10, have been filled with a portion of the lubricant from the reservoir during a preceding operation of the gun. The piston chamber measures the quantity of lubricant that can, at one time, be fed to a machine part to which the gun is applied.

The gun, in its operative condition, is attached to the source of air under pressure, by the conduit 42, and it is held in the hand of the operator who inserts his fingers through the finger opening 52 of the stock 5. After the coupling member 13 has been connected by any suitable means to the machine part to be lubricated, the operator presses against the trigger 39, which projects in one of the finger openings, and thereby opens the valve 35 and closes the valve 38 in the duct 34. This establishes the communication between the source of pressure fluid and the piston chamber 8, with the result that the large piston 20 is driven forwardly against the resistance of the spring 23.

The plunger 21 moving in conjunction with the larger piston, now drives a quantity of lubricant, measured by the content of the small piston chamber, out from the duct 12 to the machine part to which the coupling member has been applied. When the trigger 39 is released, the spring 37 closes the valve 35, shutting off the supply of fluid pressure in the duct 34, and opens the valve 38, allowing the fluid pressure in the cylinder 8 to exhaust into the atmosphere, while the spring 23 returns the pistons to their original position.

The void created in the small piston chamber, and the duct 12, by the discharge of the lubricant to the machine part, is now filled by the passage of a corresponding portion of the contents of the lubricant chamber of the container past the valve 16 into the coupling member, it being apparent that the lubricant in the container is constantly under pressure by the air admitted past the valve 31 and through the nipple 26, to the floating piston 45.

The gun is now again in condition for another operation and the operations may be repeated until the lubricant chamber of the container is entirely exhausted. When this occurs the container is removed from the stock by loosening the latch bars 48, and withdrawing the nipples from their respective glands which obviously is easily accomplished by sliding the container rearwardly along its seat on the stock. As soon as the container is demounted, the valve 31 is moved to its seat by the pressure of the spring 33, thereby preventing the escape of air.

Another container, previously filled with lubricant, is now mounted on the stock to replace the empty one, and the operator, by keeping a number of filled containers in reserve, may thus continuously feed a lubricant to the parts of an automobile, or other machine, as long as his supply of containers lasts.

Having thus described the improved grease gun, it is desired that variations in the construction and arrangement of the essential elements and parts thereof may be resorted to without departing from the scope of the invention.

The invention claimed is:—

1. A grease gun comprising a stock, a lubricant ejecting element on the stock, a demountable container on the stock, a piston dividing the container into a lubricant chamber and a pressure chamber, a valve controlled connection between the lubricant chamber and the ejecting means, and valve controlled means connecting the ejection element with a source of pressure fluid and connecting the source of pressure and the pressure chamber, the said connections including nipples on the container, in sliding relation to the stock.

2. A grease gun comprising a stock, a lubricant ejecting element on the stock, a demountable container on the stock, a piston dividing the container into a lubricant chamber and a pressure chamber, a valve controlled connection between the lubricant chamber and the ejecting means, valve controlled means connecting the ejecting element with a source of pressure fluid, and valved connecting means between the source of pressure and the pressure chamber, the said connections including packing glands on the stock and nipples on the container in sliding relation to the packing glands.

3. A grease gun comprising a stock, a demountable container on the stock, a piston dividing the container into a lubricant chamber and a pressure chamber, a lubricant ejecting element on the stock, including piston chambers of different diameters, connected pistons in the chambers, a coupling member on the stock in valve controlled connection with the smaller piston chamber, means on the stock for connecting the larger piston chamber with a source of pressure fluid, including a hand controlled valve, a valve controlled socket connected with the source of pressure and nipples on the container for connecting its chambers with the coupling and with the socket, respectively.

4. A grease gun comprising a stock, a demountable container on the stock, a piston dividing the container into a lubricant chamber and a pressure chamber, a lubricant ejecting element on the stock, a coupling member on the stock in valve controlled connection with the ejecting element, means on the stock for connecting the ejecting element with a source of pressure fluid, including a hand controlled valve, a valve controlled socket, connected with the source of pressure, and nipples on the container for the connection of its chambers with the coupling and with the socket, respectively.

5. A grease gun comprising a stock, a demountable container on the stock, a piston dividing the container into a lubricant chamber and a pressure chamber, a lubricant ejecting element on the stock, a coupling member on the stock in valve controlled connection with the ejecting element, means on the stock for connecting the ejecting element with a source of pressure fluid, including a hand controlled valve, a valve controlled socket connected with the source of pressure, and nipples on the container for the connection of its chambers with the coupling and with the socket, respectively, the nipple cooperating with the socket, controlling the position of the respective valve to open the same when the container is in place on the stock.

6. A grease gun comprising a stock, a demountable container on the stock, a piston dividing the container into a lubricant chamber and a pressure chamber, a lubricant ejecting element on the stock, a coupling member on the stock in valve controlled connection with the ejecting element, means on the stock for connecting the ejecting element with a source of pressure fluid, including a valve controlling the admission of pressure fluid to the ejecting element, a socket connected with the source of pressure, and a valve controlling the escape of fluid from the socket, a trigger on the stock in operative relation to the first mentioned valve, and nipples on the container for the connection of its chambers with the coupling and with the socket, respectively, the nipple cooperating with the socket, controlling the position of the respective valve to open the same when the container is in place on the stock.

7. A grease gun comprising a stock, a demountable container on the stock, a piston dividing the container into a lubricant chamber and a pressure chamber, a lubricant ejecting element on the stock in valve controlled connection with the lubricant chamber, means on the stock for its connection with a source of pressure fluid, including a passage to the ejecting element, and a socket, a hand moved valve controlling the passage, a spring pressed valve normally closing the socket against the escape of pressure fluid, and a nipple on the container connecting its pressure chamber with the socket, and engaging the valve to hold it off its seat.

8. A grease gun comprising a stock, a removable grease container slidably mounted on the stock, a piston in the container for driving grease therefrom, nipples on the container at opposite sides of the piston, means on the stock for feeding pressure fluid to one of the nipples, to drive the piston, and mechanism connected with the other nipple for receiving and expelling grease driven from the container.

9. A grease gun comprising a stock, a removable grease container slidably mounted on the stock, a piston in the container for driving grease therefrom, nipples on the container pointing in the same direction and being at opposite sides of the piston, fittings on the stock into which the nipples are slid when the container is slid into position on the stock, and means on the stock for feeding air pressure to one fitting, and means for receiving and expelling grease passing through the other fitting.

10. A grease gun comprising a stock, a removable grease container thereon, the stock having a connection with the container to feed air pressure thereto, means to automatically close said connection, said means being rendered operative by removal of the container, and mechanism for expelling grease driven from the container by the air pressure.

11. A grease gun comprising a stock, said stock having a pressure line, a lubricant ejecting element on the stock, a demountable container on the stock the stock being outside of the container, movable means dividing the container into a lubricant chamber and a pressure chamber, a sliding connection between the lubricant chamber and the ejecting means, and a sliding connection between the pressure line and the pressure chamber.

12. A grease gun comprising a grease container having an air inlet and a grease outlet, a stock outside the container, and sliding connections between the stock and said inlet and outlet.

13. A grease gun comprising a stock, a grease container on the stock, the stock being outside the container, the container having an air inlet and a grease outlet, an air pressure line on the stock, and a sliding connection between the air inlet of the container and said air line.

14. A grease gun comprising a demountable container having a pressure inlet and a grease outlet and a stock outside of and separable from the container, the stock having sliding connections with said inlet and outlet.

15. Lubricating apparatus comprising in combination, a portable grease gun and a plurality of lubricant containers each adapted for quick attachable-quick detachable connection with said gun, said apparatus, when the gun and a container are connected, comprising a stock, a grease container detachably secured to said stock, an air actuated piston in said container for discharging grease therefrom, an air actuated pressure booster pump relatively permanently secured to said stock, a connection from said container to said booster pump whereby grease may be supplied from the container to the pump, a discharge connection from said pump, air passages through said stock for connecting a source of compressed air supply with said container and with said air actuated pressure booster pump, and manual control means mounted on said stock for controlling the admission of air to said booster pump.

16. Lubricating apparatus comprising in combination, a portable grease gun and a plurality of lubricant containers each adapted for quick attachable-quick detachable connection with said gun, said apparatus, when the gun and a container are connected, comprising a stock, a grease container detachably secured to said stock, an air actuated piston in said container for discharging grease therefrom, an air actuated pressure booster pump relatively permanently secured to said stock, a connection from said container to said booster pump whereby grease may be supplied from the container to the pump, a discharge connection from said pump, air passages through said stock for connecting a source of compressed air supply to said container on the side of the piston opposite its side adjacent to the lubricant and to said air actuated pressure booster pump, and control means on said stock for controlling the admission of air to said booster pump.

17. A portable lubricant gun comprising a stock having provision for connection with a source of fluid pressure supply, a lubricant ejecting element including a fluid pressure operated motor in said stock, a lubricant container detachably secured to and portable with said stock, movable means dividing the container into a lubricant chamber and a chamber adapted to be put under fluid pressure, a quick detachable fluid tight connection between said lubricant chamber and said ejecting element, and means for putting the second said chamber under fluid pressure.

18. A portable lubricant hand gun consisting of a combined power unit and lubricant supply unit comprising, a power unit including a fluid pressure operated motor and a lubricant pump driven by said motor, said pump having a lubricant inlet and an outlet, and a lubricant supply unit including a container having a lubricant outlet, a piston in said container, and a quick attachable-detachable connection between said container outlet and said pump inlet.

19. A portable lubricant hand gun comprising, a lubricant container having a piston therein and a lubricant outlet at one end, a lubricant pump having a lubricant inlet and a lubricant outlet, a stock carrying fluid pressure operated means for operating said pump, and a quick attachable-detachable connection between said container outlet and said pump inlet, said container being detachably supported by said stock.

20. A portable lubricant hand gun comprising, a stock, means for connecting said stock with a source of air under pressure, a lubricant container adapted to be secured to and carried by said stock on the outside thereof, said container having an air inlet for air under pressure from the stock and also having a lubricant outlet, and a quick attachable-detachable connection between said container and stock for at once securing said stock and container together and completing air connections between the container and stock.

21. In a device of the character described, a barrel having a chamber for fluids, a follower in said barrel, a valved conduit for supplying air behind said follower, a power device comprising a piston and a plunger, means co-operating with the plunger to receive fluids from said chamber when the plunger is retracted and discharge them on a power stroke of the piston and plunger, and means for reciprocating the piston and plunger including means for admitting air under pressure behind the piston on its power stroke and into said chamber, the last said means including a hand trigger controlled opening and automatically closing valve mechanism, said valve mechanism normally venting air to the atmosphere from behind said piston when the trigger is released.

22. In a device of the character described, a barrel having a chamber for fluids, a floating piston in said chamber adapted to press on said fluids, a power device comprising a power piston and a plunger, means cooperating with the plunger to receive fluids from said chamber when the plunger is retracted and discharge them on the power stroke of the power piston and plunger, and means for reciprocating the power piston and plunger including means for admitting air under pressure behind both the power piston and the floating piston in said chamber, the last said means including a hand trigger controlled opening and automatically closing valve mechanism, said valve mechanism normally venting air to the atmosphere from behind said piston when the trigger is released.

23. In a portable lubricant hand gun consisting of a power unit and a lubricant supply unit, a lubricant container having a piston therein and a lubricant outlet at one end, said piston being adapted and arranged to force lubricant toward said outlet, means for pressing said piston against the lubricant, a stock, a fluid operated motor in said stock, a high pressure chamber for reception of lubricant from said container, a high pressure piston in said chamber, a connection between said motor and high pressure piston for driving the latter, and a quick attachable-detachable connection between said container and stock, said container and stock being independent units when detached from one another, said units mutually supporting one another when connected.

24. A portable hand lubricant gun comprising, a stock adapted to be grasped by the hand of the operator, a fluid pressure operated motor carried by said stock, a high pressure pump including a high pressure cylinder carried by said stock and a plunger in said cylinder and secured to said motor, a lubricant supply chamber disposed alongside of and secured to said stock, said container and stock being disposed substantially parallel to one another along their length, a piston in said chamber, a lubricant outlet from one end of said chamber connecting with said high pressure cylinder, a fluid pressure inlet at the other end of said chamber for connection with a source of fluid pressure supply, an outlet from said high pressure cylinder, a check valve in said outlet, a finger operated trigger controlled valve in said stock for controlling the admission of fluid under pressure to said motor on its power stroke, and means for admitting air to said chamber.

25. A grease gun comprising a stock, a lubricant ejecting element on said stock, a demountable container on said stock, a piston dividing the container into a lubricant chamber and a pressure chamber, a valve controlled connection between the lubricant chamber and the ejecting element, valve controlled means connecting the ejecting element with a source of fluid pressure and connecting the source of pressure and the pressure chamber, one of said connections including male and female members in sealing contact with one another, one of said members being on the container and the other being secured to said stock, and means for latching said container and stock together with said members in sealing contact.

26. A hand portable grease gun comprising, a stock, a lubricant ejecting fluid operated pump secured to said stock, a lubricant container demountably connected with said stock, a piston in said container, a valve controlled connection between one end of said container and the intake of said pump, said connection including a nipple member and a socket member, one of said members being on the container and the other on the stock, means for quick-detachably securing said members together, and valve controlled means for supplying fluid under pressure to said container behind said piston therein and to said pump for the operation thereof.

27. A grease gun comprising a stock, a removable grease container slidably mounted on the stock, a piston in the container for driving grease therefrom, sealing means on the container at opposite ends thereof, said sealing means being directed in the same direction, and being adapted for engagement with cooperative sealing means on the stock, cooperative sealing means on the stock against which said sealing means on the container may be slid when the container is slid into position on the stock, each sealing means with its cooperative sealing means providing a quick attachable-detachable fluid tight connection, means on the stock for supplying a fluid under pressure to one connection, and means for receiving and expelling grease passing through the other connection.

28. A grease gun comprising a stock, a removable grease container slidably mounted on the stock, a piston in the container, said container having an inlet for fluid under pressure behind said piston and an outlet ahead of said piston for ejection of grease from the container, sealing means about said inlet and said outlet for engagement with cooperative sealing means on the stock, cooperative sealing means on the stock against which said sealing means on the container may be pressed when the container is slid into position on the stock, each sealing means with its cooperative sealing means providing a quick attachable-detachable fluid tight connection, means on the stock for supplying fluid under pressure through said container inlet and behind said piston, and fluid pressure operated means for receiving and expelling under high pressure the fluid expelled from the outlet of said container.

29. A hand portable grease gun comprising, a stock having means for connection of an air pressure line, a grease outlet conduit on the stock, a lubricant container demountably carried by said stock, means in said container movable longitudinally thereof and separating the grease and air therein, a sealing nipple and socket connection between the grease end of said container and said grease outlet conduit, means for supplying air to the air side of said separating means from said air connection means, and means for detachably securing said stock and container together.

30. A hand portable grease gun comprising, a stock unit, a grease container unit removably mounted on the stock, an air-motor pump on the stock, said container having a grease outlet, means for subjecting the grease in said container to air pressure above atmospheric pressure, means on the stock for connection of an air pressure line for supplying air to said air motor and to said means for subjecting the grease to air pressure, and a nipple and socket seal effecting connection between the grease outlet of the container and said pump.

31. A hand portable grease gun comprising, a stock unit and a grease container unit on the stock, said container having a grease outlet and a follower, means detachably securing said container unit on the stock, a grease outlet conduit substantially permanently secured to the stock, a nipple and socket seal effecting connection between the grease outlet of the container and said grease outlet conduit, means for subjecting said follower and the grease in said container to air under pressure above atmospheric pressure, and means on the stock for connection of an air pressure line for supplying air against said follower and the grease in said container.

32. In a hand portable lubricant power gun of the character described, a barrel having a floating piston therein, said floating piston being adapted to divide said barrel into a lubricant reservoir and an air chamber, a stock, an air conduit through said stock leading from a source of compressed air to said air chamber, a valve in said conduit, a power device comprising a power piston and a plunger mounted in said stock, means cooperating with the plunger to receive lubricant from said reservoir when the plunger is retracted and to discharge the lubricant on a power stroke of said power piston and plunger, and means for actuating said piston and plunger including means for admitting air under pressure behind said power piston while air is being admitted into said chamber, the last said means including a conduit connected with the first said conduit and a hand trigger operated thereby, said trigger valve normally venting air to the atmosphere from behind said power piston when the trigger is released.

33. A power unit adapted to be interchangeably connected with any one of a plurality of lubricating guns each containing a lubricant expeller member, said power unit carrying a motivating means therein arranged to effect actuation of said member when said guns and power unit are connected.

34. A power unit adapted to be selectively and interchangeably connected with any one of a plurality of lubricating guns each containing a lubricant expeller member, said power unit having motivating means therein for cooperation with said expeller member whereby the power unit may be employed for dispensing lubricant of different guns to different parts of a device to be lubricated, and a manual control for the motivating means of said power unit.

35. A power unit adapted to be interchangeably connected with portable lubricant guns having discharge nozzles and lubricant reservoirs, means for detachably connecting said power unit with said lubricant guns and said power unit having motivating means therein for effecting the discharge of lubricant from the guns, and control means for said motivating means.

36. A power unit adapted to be interchangeably connected with portable lubricant guns having discharge nozzles and lubricant reservoirs, means for detachably connecting said power unit with said lubricant guns and said power unit having motivating means therein for operating said guns for discharging lubricant from the guns and control means for said motivating means.

37. A grease gun comprising a holder for a charge of grease, means for charging the holder with grease, a pneumatically actuated piston having an ejector working in the holder to expel the charge therefrom when the piston is moved in one direction, a cylinder for the piston, a handle supporting the charging means, the holder and the cylinder, and means to permit air to be supplied to the cylinder to operate the piston and including a structure having an exhaust port connecting the cylinder with the handle and the said handle being open at one point to permit the exhaust air as it leaves the cylinder to be discharged therefrom.

38, A grease gun comprising a holder for a charge of grease, means for charging the holder with grease, a pneumatically actuated piston having an ejector working in the holder to expel the charge therefrom when the piston is moved in one direction, a cylinder for the piston, a handle supporting the charging means, the holder and the cylinder, and means to permit air to be supplied to the cylinder to operate the piston and including a structure having an exhaust port connecting the cylinder with the handle, and the said handle being open at one point to permit the exhaust air as it leaves the cylinder to be discharged therefrom, the charging means including a cylinder for containing grease, a piston operating therein, the cylinder of the charging means having a valved passage leading to the holder, and means connecting the cylinder of said charging means with the air supplying means to permit air from the latter to be delivered to the charging cylinder and to act upon the piston thereof.

39. A grease gun comprising, a body having a holder for a charge of grease, a cap on the body having a port leading to the holder, means for delivering a grease charge to the holder including a grease container having an end detachably connected to the cap, fluid pressure actuated means for delivering a charge from the container to the holder, fluid pressure actuated mechanism for ejecting a charge from the holder, means for supplying actuating fluid pressure to said fluid pressure actuated means from a fluid pressure source, and means for supplying actuating fluid pressure from said source to the said ejecting mechanism.

40. A grease gun comprising a body member having a high pressure grease discharging cylinder, a fluid pressure actuated device carried by said body member for discharging grease from said cylinder, a detachable grease cartridge connected to said body member, a low pressure piston slidable in said grease cartridge for discharging grease therefrom, a check valve controlled passageway in said body member for delivering grease from said cartridge to said cylinder, means for supplying fluid pressure to said fluid pressure actuated device and to said low pressure piston comprising a branched passageway formed in said body member, one branch being connected to said fluid pressure actuated device and another branch being constructed and arranged to supply fluid to actuate said low pressure piston.

FRANCIS M. GODDARD,
*Administrator of the Estate of Charles F. Goddard, Deceased.*